United States Patent
Rehman

(10) Patent No.: US 7,497,563 B2
(45) Date of Patent: Mar. 3, 2009

(54) SELF-DISPERSED INKS FOR SAME ORIFICE PLATE SYSTEMS

(75) Inventor: Zia Ur Rehman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 10/863,921

(22) Filed: Jun. 9, 2004

(65) Prior Publication Data

US 2005/0275685 A1 Dec. 15, 2005

(51) Int. Cl.
*G01D 11/00* (2006.01)

(52) U.S. Cl. .................... 347/100; 347/96; 347/101

(58) Field of Classification Search .......... 347/43, 347/100, 95, 96, 101; 106/31.6, 31.13, 31.27; 523/160
See application file for complete search history.

(56) References Cited

U.S. PATENT DOCUMENTS

| | | | |
|---|---|---|---|
| 5,554,739 A | 9/1996 | Belmont | |
| 5,571,311 A | 11/1996 | Belmont et al. | |
| 5,630,868 A | 5/1997 | Belmont et al. | |
| 5,707,432 A | 1/1998 | Adams et al. | |
| 6,332,919 B2 * | 12/2001 | Osumi et al. | 106/31.6 |
| 6,500,880 B1 * | 12/2002 | Parazak | 523/160 |
| 2002/0033869 A1 | 3/2002 | Kurabayashi | |
| 2002/0054187 A1 * | 5/2002 | Kato et al. | 347/43 |
| 2002/0060716 A1 | 5/2002 | Kato et al. | |
| 2002/0147252 A1 | 10/2002 | Adams | |
| 2004/0059021 A1 | 3/2004 | Okada | |
| 2005/0128272 A1 | 6/2005 | Moroshosi et al. | |

FOREIGN PATENT DOCUMENTS

| | | |
|---|---|---|
| EP | 0 900 663 A | 3/1999 |
| EP | 0943666 | 9/1999 |
| EP | 1 052 097 A | 11/2000 |
| EP | 1085062 | 3/2001 |
| EP | 1354921 | 10/2003 |
| JP | 2002080763 | 3/2002 |
| JP | 2002154263 | 5/2002 |
| JP | 2003300374 | 10/2003 |
| JP | 2004143290 | 5/2004 |
| WO | WO 2004/018211 A | 3/2004 |
| WO | 2005012446 | 2/2005 |

* cited by examiner

*Primary Examiner*—Manish S Shah

(57) ABSTRACT

Printer systems, self-dispersed black pigment ink formulations, and methods of printing, are disclosed. One exemplary printer system, among others, includes a dispensing system including a printhead. The printhead includes a self-dispersed black pigment in a first compartment fluidically communicating with an orifice plate and a first nozzle. In addition, the printhead includes a color ink in a second compartment fluidically communicating with the orifice plate and a second nozzle. The first nozzle and the second nozzle are adjacent one another on the same orifice plate.

10 Claims, 2 Drawing Sheets

SELF-DISPERSED INKS FOR SAME ORIFICE PLATE SYSTEMS

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward improving the permanence of inkjet images because this property still falls short of the permanence produced by other printing and photographic techniques. A continued demand in inkjet printing has resulted in the need to produce images of high quality, high permanence, and high durability, while maintaining a reasonable cost.

In inkjet printing, the inkjet image is formed on a print medium when a precise pattern of dots is ejected from a drop-generating device known as a printhead. The typical inkjet printhead has an array of precisely formed nozzles located on a nozzle plate and attached to an inkjet printhead array. The nozzles are typically 30 to 40 micrometers in diameter. The inkjet printhead array incorporates an array of firing chambers that receive liquid ink, which includes pigment-based inks and/or dye-based inks dissolved or dispersed in a liquid vehicle, through fluid communication with one or more ink reservoirs. Each chamber has a thin-film resistor, known as a firing resistor, located opposite the nozzle so ink can collect between the firing resistor and the nozzle. The printhead is held and protected by an outer packaging referred to as a print cartridge or an inkjet pen.

Upon energizing of a particular firing resistor, a droplet of ink is expelled through the nozzle toward the print medium to produce the image. The color inks and the black inks are usually expelled out of different printheads because the black and color inks react and clog or otherwise impede the ejection of the ink from one printhead.

SUMMARY

Briefly described, embodiments of this disclosure include printer systems, self-dispersed black pigment ink formulations, and methods of printing. One exemplary printer system, among others, includes a dispensing system including a printhead. The printhead includes a self-dispersed black pigment in a first compartment fluidically communicating with an orifice plate and a first nozzle. In addition, the printhead includes a color ink in a second compartment fluidically communicating with the orifice plate and a second nozzle. The first nozzle and the second nozzle are adjacent one another on the same orifice plate.

Another exemplary printer system, among others, includes a dispensing system including a first printhead having an orifice plate. The orifice plate includes a first array of nozzles and a second array of nozzles that are adjacent one another. The first printhead includes a self-dispersed black pigment and a color ink. The self-dispersed black pigment is dispensed through the first array of nozzles and the color ink is dispensed through the second array of nozzles.

One exemplary self-dispersed black pigment ink formulation, among others, includes a self-dispersed black pigment in an amount form about 0.6 to 6 weight percent of the self-dispersed black pigment ink formulation, a solvent in an amount from about 10 to 35 weight percent of the self-dispersed black pigment ink formulation, a salt in an amount from about 0.01 to 6 weight percent of the self-dispersed black pigment ink formulation, and an aqueous solution in an about from about 45 to 90 weight percent of the self-dispersed black pigment ink formulation.

One exemplary method of printing, among others, includes providing a dispensing system including a first printhead having an orifice plate, wherein the orifice plate includes a first array of nozzles and a second array of nozzles that are adjacent one another; and dispensing a self-dispersed black pigment and a color ink, wherein the self-dispersed black pigment is dispensed through the first array of nozzles, and wherein the color ink is dispensed through the second array of nozzles.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Self-dispersed inks and same orifice plate (SOP) printer systems using the self-dispersed inks are described. Embodiments of the present disclosure enable black self-dispersed pigmented ink formulations and color inks to be dispensed from adjacent nozzles of the same orifice plate without clogging the nozzles. Once dispensed, the black self-dispersed pigmented ink formulations are stable formulations that achieve adequate print quality, smear characteristics, optical density, and water fastness when compared to other inks, as well as adequate bleeding characteristics with color dyes once dispensed onto print media.

Figure 1:
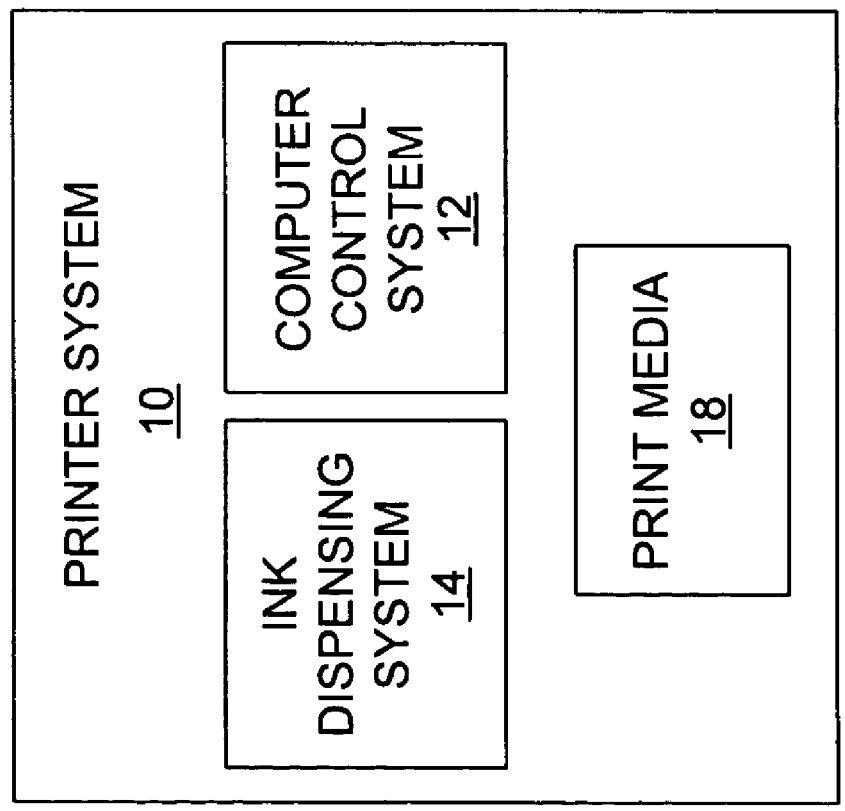
FIG. 1 illustrates an embodiment of a printer system.

FIG. 1 illustrates a block diagram of a representative SOP printer system 10 that includes a computer control system 12, an ink dispensing system 14, and a print medium 18. The computer control system 12 includes a process control system that is operative to control the ink dispensing system 14. In particular, the computer control system 12 instructs and controls the ink dispensing system 14 to print characters, symbols, photos, etc. onto the print medium 18.

Figure 2:
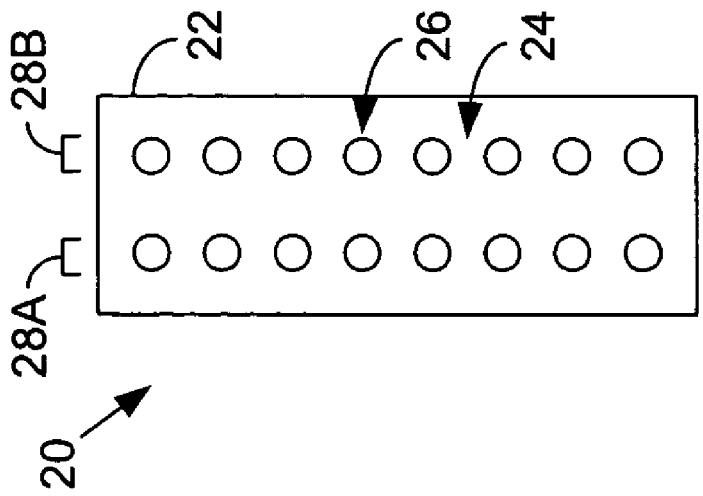
FIG. 2 illustrates an embodiment of a print head that can be used in the printer system of FIG. 1.

The ink dispensing system 14 includes, but is not limited to, conventional ink-jet technologies and conventional coating technologies, which dispense the ink (e.g., dye-based ink and pigment-based ink) onto the print media. Ink-jet technology, such as drop-on-demand and continuous flow ink-jet technologies, can be used to dispense the ink. The ink dispensing system 14 can include at least one conventional ink-jet printhead system 20 (e.g., thermal ink-jet printhead and/or a piezo ink-jet print head) operative to dispense (e.g., jet) the inks through one or more of a plurality of nozzles 26 in a printhead 22 as shown in FIG. 2. The printhead 22 has a first array of nozzles 28A and a second array of nozzles 28B located adjacent one another on the orifice plate 24. The printhead system 20 incorporates an array of firing chambers (not shown) that receive the ink (e.g., a black self-dispersed pigmented ink and color ink) dissolved or dispersed in a liquid vehicle, which are in fluid communication with one or more ink reservoirs (not shown). It should be noted that the printhead 22 can include from four to fourteen arrays of nozzles, where each array of nozzles is located adjacent at least one other array of nozzles.

As mentioned above, the first array of nozzles 28A and the second array of nozzles 28B are adjacent one another on the same orifice plate 26. Although the first array of nozzles 28A and the second array of nozzles 28B are adjacent one another, the black self-dispersed pigmented ink formulation and color ink do not react with one another to substantially clog or otherwise impede the dispensing of either the black self-dispersed pigmented ink formulation and color ink from their respective array of nozzles. For example, the black self-dispersed pigmented ink formulations is dispensed from the first array of nozzles 28A, while the color ink is dispensed from the second array of nozzles 28B. Dispensing of the black self-dispersed pigmented ink formulations and color ink does not substantially clog or otherwise impede the dispensing of either the black self-dispersed pigmented ink formulations and color ink although the inks are dispensed from the same orifice plate 24.

Figure 3:
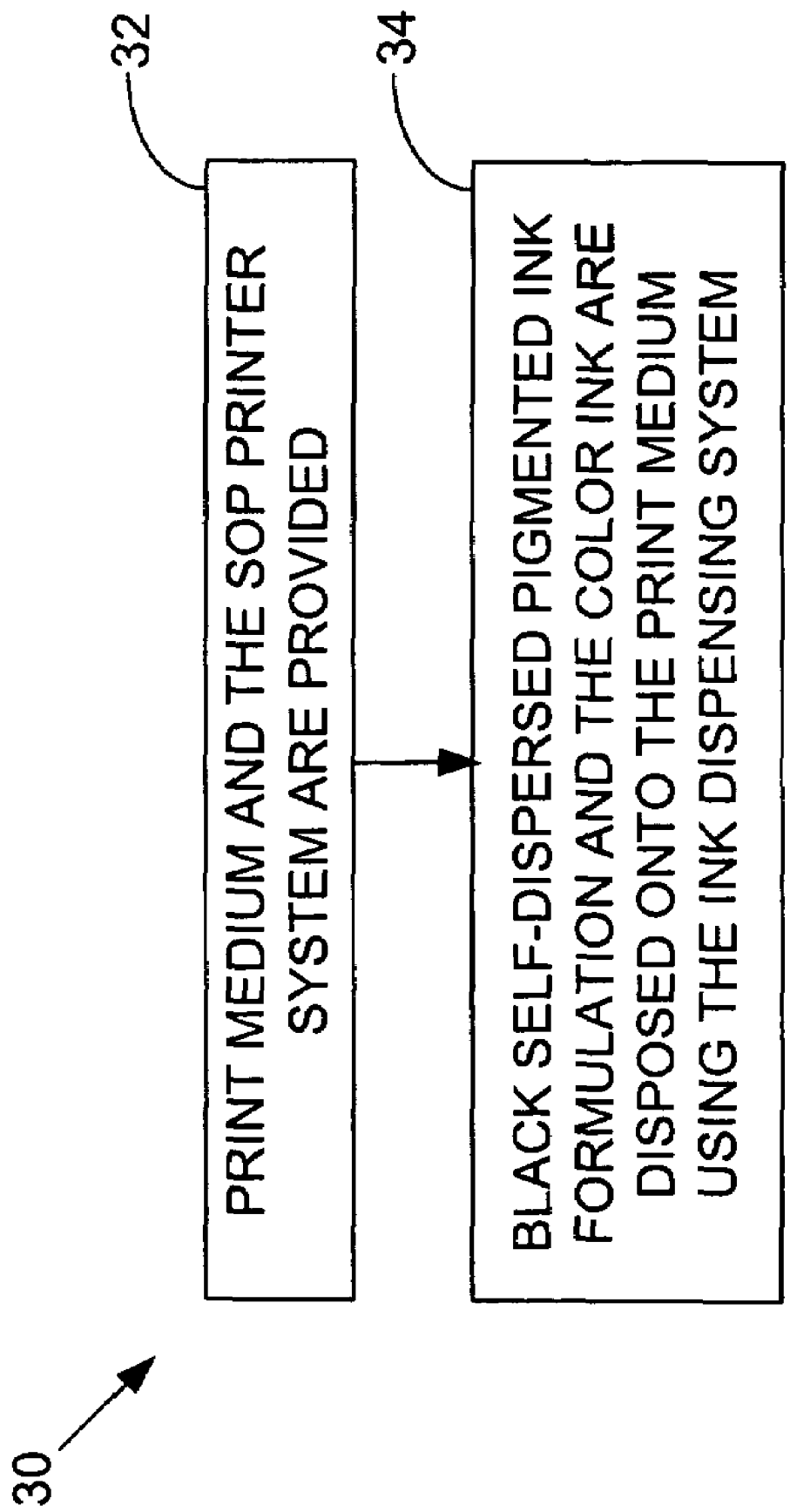
FIG. 3 illustrates a flow diagram of a representative embodiment for dispensing ink using the printer system of FIG. 1.

FIG. 3 is a flow diagram describing a representative method 30 for printing on the print media using the SOP printer system 10. In block 32, the print medium and the SOP printer system 10 are provided. The SOP printer system 10 includes the ink dispensing system 14 that includes a black self-dispersed pigmented ink formulation and at least one color ink. In block 34, the black self-dispersed pigmented ink formulation and the color ink are disposed onto the print medium 18 using the ink dispensing system 14. The black self-dispersed pigmented ink formulation and the color ink are dispensed from the printhead system 20. In particular, the black self-dispersed pigmented ink formulation and the color ink are dispensed from adjacent arrays of nozzles (i.e., the first and second array of nozzles 28A and 28B) on the same orifice plate 24.

The term "print media" can include, but is not limited to, a paper substrate, a photobase substrate, a plastic media (e.g., clear to opaque plastic film) substrate, and the like. The print media may include, but is not limited to, a hard or flexible material made from a polymer, a paper, a glass, a ceramic, a woven cloth, or a non-woven cloth material.

The black self-dispersed pigmented ink formulation can include, but is not limited to, a solvent, a salt, a buffer, a biocide, and a surfactant. The black self-dispersed pigmented inks include, but are not limited to, chemically modified water-dispersible pigments such as self-dispersed carbon black. These chemical modifications impart water-dispersibility to the black self-dispersed pigmented ink precursors that encompass organic pigments. For example, self-dispersed carbon blacks include oxidized carbon blacks, surface modified carbon blacks, and a combination of oxidized and surface modified carbon blacks.

For self-dispersibility or water solubility, the pigments can be modified by the addition of one or more organic groups such as, but not limited to, at least one aromatic group or a $C_1$-$C_{12}$ alkyl group and at least one ionic group or ionizable group. The ionizable group is one that forms its ionic groups in the aqueous medium. The ionic group may be anionic or cationic. The aromatic groups can be substituted or unsubstituted. Examples include phenyl or napthyl groups and the ionic group can include, but is not limited to, sulfanilic acid, sulfinic acid, phosphonic acid, carboxylic acid, ammonium, quaternary ammonium, or a phosphonium group.

Depending on the process selected, the black self-dispersed pigmented ink can either be anionic or cationic in character. As commercially available, the anionic chromophores are usually associated with sodium or potassium cations, and the cation chromophores are usually associated with chloride or sulfate anions.

One method of forming the black self-dispersed pigmented ink includes treating the black self-dispersed pigmented ink precursor with aryl diazonium salts containing at least one acidic functional group. Examples of aryl diazonium salts include those prepared from sulfanilic acid, 4-aminobenzoic acid, 4-aminosalicylic acid, 7-amino-4-hydroxy-2-naphthlenesulfonic acid, aminophenylboronic acid, aminophenylphosphonic acid and metanilic acid.

Ammonium, quaternary ammonium groups, quaternary phosphonium groups, and protonated amine groups represent examples of cationic groups that can be attached to the same organic groups discussed above.

Black self-dispersed pigmented inks and methods of attaching functionalized groups are described in See U.S. Pat. Nos. 5,707,432; 5,630,868; 5,571,311; and 5,554,739, all of which are incorporated herein by reference.

The following black pigments are useful in the practice of this disclosure; however, this listing is merely illustrative and not intended to limit the disclosure. The following black pigments are available from Cabot: Monarch™ 1400, Monarch™ 1300, Monarch™ 1100, Monarch™ 1000, Monarch™ 900, Monarch™ 880, Monarch™ 800, and Monarch™ 700, Cab-O-Jet™ 200 and Cab-O-Jet™ 300. The following black pigments are available from Columbian: Raven 7000, Raven 5750, Raven 5250, Raven 5000, and Raven 3500. The following black pigments are available from Degussa: Color Black FW 200, Color Black FW 2, Color Black FW 2V, Color Black FW 1, Color Black FW 18, Color Black S 160, Color Black FW S 170, Special Black 6, Special Black 5, Special Black 4A, Special Black 4, Printex U, Printex 140U, Printex V, and Printex 140V. Tipure™. R-101 is available from DuPont.

The solvent can include, but is not limited to, water soluble organic solvents. The water soluble organic solvents can include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, the solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides.

In particular, the solvent can include, but is not limited to, ethoxylated glycerol, 2-methyl-1,3-propanediol, 2-methyl 2,4-pentanediol, 1,5-pentanediol, 2-pyrrolidone, 1-(2-hydroxylethyl)-2-pyrrolidinone, 2-ethyl-2-hydroxymethyl-1,3-propanediol, diethylene glycol, 3-methoxybutanol, and 1,3-dimethyl-2-imidazolidinone. The solvent can also include, but is not limited to, 1,2 hexanediol, 1,2 octanediol, 2,5 dimethyl 3 hexyne 2,5 diol, trimethylol propane, 3 hexyne 2,5 diol, sulfolane, 3 pyridyl carbinol, and other pyridine derivatives. In addition, the solvents can be added to reduce the rate of evaporation of water in the ink-jet to minimize clogging or other properties of the ink such as viscosity, pH, surface tension, optical density, and print quality.

The salt can include, but is not limited to, ammonium, potassium, or lithium benzoate salts; ammonium, potassium, or lithium acetates; lithium, potassium, or lithium xylene sulfonate salts; nitrates of $NH_4$, lithium, and potassium; lactates of ammonium, potassium, or lithium; citrates of ammonium, potassium, or lithium; carbonates of sodium, lithium, and potassium, diphosphates of sodium, lithium, and potassium; triphosphates of sodium, lithium, and potassium; and mixtures thereof. In addition, the salt can include sodium, lithium, and potassium salts of compounds such as, but not limited to, citrate, succinate, lactate, formate, gluconate, tartrate, malonate, fumarate, malate, sebacate, laurate, glutarate, acetate, oxylate, adipiate, pimelicate, subericate, azelaicate, and mixtures thereof.

Various buffers or pH adjusting agents can also be optionally used in the black self-dispersed pigmented ink formulation. The buffering agents can include, but are not limited to, hydroxides of alkali metals and amines (e.g., lithium hydroxide, sodium hydroxide, potassium hydroxide; citric acid); amines (e.g., triethanolamine, diethanolamine, and dimethylethanolamine); hydrochloric acid; and other basic or acidic components which do not substantially interfere with the bleed control or optical density characteristics. In addition, commercially available pH buffers can also be used and are available from Sigma Aldrich (e.g., MES, MOPs, Trizma, Bis-Tris, MOPSO, TES, TAPSO, TEA, TRICINE, BICINE, TAPS, and AMPSO, in the acid or salt form).

Various biocides can be used to inhibit growth of undesirable microorganisms. The biocides can include, but are not limited to, benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas), and other biocides.

Various surfactants can be used in the black self-dispersed pigmented ink. The surfactants can include, but are not limited to, anionic, non-ionic, and zwitterionic surfactants. The anionic surfactant can include, but is not limited to, sodium or potassium salts of straight chain fatty acids; sodium and potassium salts of coconut oil fatty acids; sodium and potassium salts of tall oil fatty acids; amine salts; acylated polypeptides; linear alkyl benzene sulfonates; higher alkyl benzene sulfonates; benzene; toulene; xylene; cumenesulfonate; lignosulfonates; petroleum sulfonates; N-acyl-n-alkyltaurates; paraffin sulfonates; secondary n-alkanesulfonates; alpha olefin sulfonates; sulfosuccnic esters; alkyl naphalene sulfonates; isothionates; sulfuric acid ester salts; sulfated polyoxyethylenated straight-chain alcohols; sulfated triglycerides oils; phosphoric and polyphosphoric acid esters; and perfluorinated anionic surfactants.

The non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, aklanolamine condensates, alkanolamides, tertiary aceylenic glycols, polyoxyethylenated silicones, N-alkylpyrrolidones and alkylpolyglycosides.

The zwitterionic surfactant can include, but is not limited to, beta-N-alkylaminopropionic acids, N-alkyl-beta-aminodipropionic acids, imidazoline carboxylates, N-alkylbetaines, amine oxides, sulfobetaines and sultaines surfactants.

In addition, binders can be included in the black self-dispersed pigmented ink, which act to secure the ink on the print medium. The binders can include, but are not limited to, compounds having molecular weight (MW) of from about 200 MW to about 10000 MW. The binders can include, but are not limited to, polyester, polyester-melamine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

In one embodiment, the black self-dispersed pigmented ink formulation can include an amount of the black self-dispersed pigmented ink from about 0.5 to 6 weight percent of the formulation, an amount of solvent from about 10 to 35 weight percent of the formulation, and an amount of salt from about 0.01 to 6 weight percent of the formulation, while the remaining portion of the formulation is water. In another embodiment, the black self-dispersed pigmented ink formulation can include an amount of the black self-dispersed pigmented ink from about 0.5 to 6 weight percent of the formulation, an amount of solvent from about 10 to 35 weight percent of the formulation, an amount of salt from about 0.01 to 6 weight percent of the formulation, an amount of a buffer from about 0 to 0.5 weight percent of the formulation, an amount of a surfactant from about 0 to 3 weight percent of the formulation, and an amount of a biocide from about 0 to 0.3 weight percent of the formulation, while the remaining portion of the formulation is water. It should also be noted that the black self-dispersed pigmented ink formulation could include other components.

In another embodiment, the black self-dispersed pigmented ink formulation can include an amount of the black self-dispersed pigmented ink from about 1 to 6 weight percent of the formulation, an amount of ethoxylated glycerol from about 0.1 to 4.5 weight percent of the formulation, an amount of 2-pyrrolidinone from about 0.1 to 10 weight percent of the formulation, an amount of 1,5-pentanediol from about 0.1 to 10 weight percent of the formulation, an amount of 2-methyl-1,3-propanediol from about 0.1 to 1.5 weight percent of the formulation, an amount of Surfynol 465 from about 0.001 to 0.3 weight percent of the formulation, an amount of 2-methyl 2,4-pentanediol from about 0.1 to 5 weight percent of the formulation, an amount of ammonium benzoate from about 0 to 1.5 weight percent of the formulation, an amount of potassium acetate from about 0 to 1.5 weight percent of the formulation, an amount of ammonium acetate from about 0 to 1.5 weight percent of the formulation, an amount of ammonium sulfate from about 0 to 1.5 weight percent of the formulation, an amount of TRIS buffer from about 0 to 0.3 weight percent of the formulation, and an amount of Proxel GXL from about 0 to 0.1 weight percent of the formulation, while the remaining portion of the formulation is water.

The color ink can include, but is not limited to, dye-based inks and pigment-based inks. The dye-based inks and pigment-based inks may be nonionic, cationic, anionic, or mixtures thereof. Color dye-based inks and pigment-based inks for use in ink-jet printing may be employed in the practice of this disclosure. The color inks can include a large number of water-soluble acid and direct dyes. For the purposes of clarification only, and not for limitation, some exemplary colorants suitable for this purpose are set forth below.

Specific examples of such dyes include the Pro-Jet series of dyes available from Avecia Ltd., including Direct Yellow 86, Acid Red 249, Direct Blue 199, Direct Black 168, and Direct Yellow 132; Aminyl Brilliant Red F-B (Sumitomo Chemical Co.); the Duasyn line of "salt-free" dyes available from Hoechst, such as Reactive Black 31, Direct Yellow 157, Reactive Yellow 37, Acid Yellow 23, Reactive Red 180, Acid Red 52, and Acid Blue 9; mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Direct Blue 199, Carolina Color and Chemical), Direct Blue 86, Mobay Chemical), Reactive Red 4, Aldrich Chemical), Reactive Red 56, Pylam, Inc., Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B. Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Direct Yellow 86, Carolina Color and Chemical, Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. This list is intended to be merely exemplary, and should not be considered limiting.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

Many variations and modifications may be made to the above-described embodiments. All such modifications and variations are intended to be included herein within the scope of this disclosure and protected by the following claims.

At least the following is claimed:

1. A printer system, comprising:
   a dispensing system including a printhead, wherein the printhead includes a self-dispersed black pigment formulation in a first compartment fluidically communicating with an orifice plate and a first nozzle, wherein the printhead includes a color ink formulation in a second compartment fluidically communicating with the orifice plate and a second nozzle, wherein the first nozzle and the second nozzle are adjacent one another on the same orifice plate, wherein the self-dispersed black pigment formulation and the color ink formulation do not react with one another, wherein the self-dispersed black pigment formulation and the color ink formulation do not react with one another on the orifice plate, and where such reaction would impede ejection of the self-dispersed black pigment formulation from the first nozzle and ejection of the color ink formulation from the second nozzle.

2. The printer system of claim 1, wherein the self-dispersed black pigment formulation includes the self-dispersed black pigment is selected from an oxidized carbon black, a surface modified carbon black, and a combination of oxidized and surface modified carbon black.

3. The printer system of claim 1, wherein the first nozzle and the second nozzle are each arrays of nozzles adjacent one another on the same orifice plate.

4. The printer system of claim 3, further comprising an additional two to twelve arrays of nozzles on the same orifice plate, wherein each array of nozzles are adjacent one another.

5. The printer system of claim 1, wherein the color ink is selected from a pigment-based ink, a dye-based ink, and combinations thereof.

6. The printer system of claim 2, wherein the self-dispersed black pigment formulation includes a solvent selected from ethoxylated glycerol, 2-methyl-1, 3-propanediol, 2-methyl 2,4-pentanediol, 1,5-pentanediol, 2-pyrrolidone, and combinations thereof.

7. The printer system of claim 2, wherein the self-dispersed black pigment formulation includes a salt selected from a benzoate salt, an acetate salt, a sulfate salt, and combinations thereof.

8. The printer system of claim 2, wherein the self-dispersed black pigment formulation includes a solvent selected from: primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

9. The printer system of claim 2, wherein the self-dispersed black pigment formulation includes a solvent selected from ethoxylated glycerol, 2-methyl-1, 3-propanediol, 2-methyl 2,4-pentanediol, 1,5-pentanediol, and combinations thereof.

10. The printer system of claim 9, wherein the self-dispersed black pigment formulation is an acetate salt.

* * * * *